United States Patent [19]
Fujioka

[11] Patent Number: 4,620,775
[45] Date of Patent: Nov. 4, 1986

[54] FRONT-DIAPHRAGM WIDE ANGLE LENS

[75] Inventor: Yoshisato Fujioka, Higashikurume, Japan

[73] Assignee: Ricoh Company, Ltd., Japan

[21] Appl. No.: 780,574

[22] Filed: Sep. 26, 1985

[30] Foreign Application Priority Data

Sep. 26, 1984 [JP] Japan .................. 59-199526

[51] Int. Cl.[4] .............................. G02B 9/16
[52] U.S. Cl. ........................ 350/449; 350/475
[58] Field of Search .................. 350/474, 475, 449

[56] References Cited
U.S. PATENT DOCUMENTS

| 3,649,103 | 3/1972 | Kamimura | 350/449 X |
| 3,895,857 | 7/1975 | Imai | 350/449 X |
| 3,910,685 | 10/1975 | DeJager | 350/449 X |
| 3,912,379 | 10/1975 | DeJager | 350/449 X |
| 3,967,884 | 7/1976 | DeJager | 350/475 |
| 4,522,471 | 6/1985 | Nishioka | 350/449 |
| 4,542,961 | 9/1985 | Sato | 350/449 X |

Primary Examiner—John K. Corbin
Assistant Examiner—Scott J. Sugarman
Attorney, Agent, or Firm—Guy W. Shoup

[57] ABSTRACT

In a triplet photographic lens wherein a diaphragm is arranged forwardly of a lens, an asymmetry of arrangement with respect to the diaphragm has been remarkable to make it difficult to provide a wide angle.

According to the present invention, principally a second lens $L_2$ and a third lens $L_3$ are bended so as to come closer to a centripetal shape about the diaphragm to make small the full length and a spacing between lenses thereby providing compensation of aberrations and increasing relative illumination, thus providing a wide angle lens having an angle of view of 70°.

4 Claims, 6 Drawing Figures

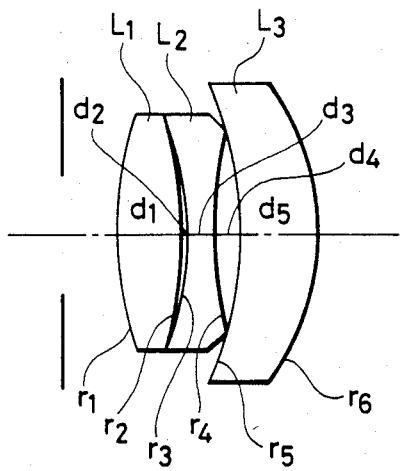
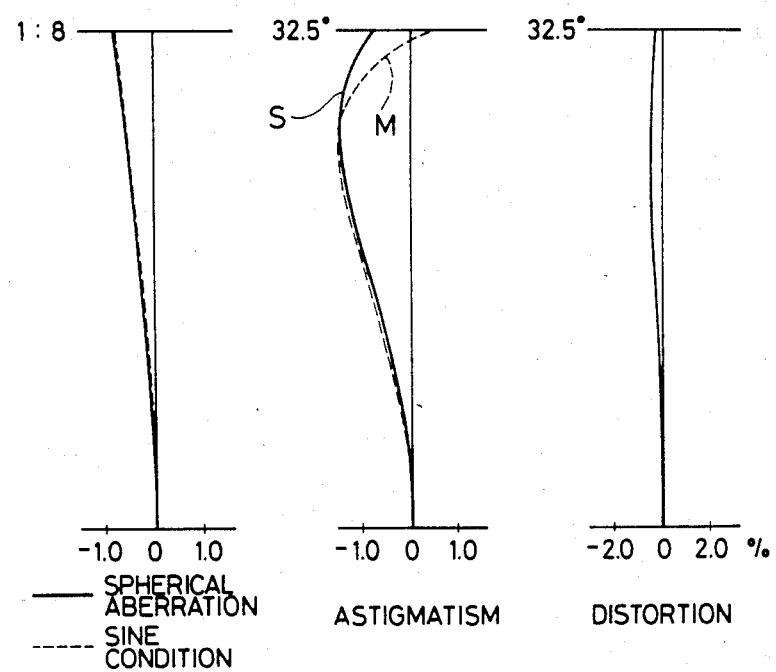

FRONT-DIAPHRAGM WIDE ANGLE LENS

BACKGROUND OF THE INVENTION

1. Field of the Invention

This invention relates to a front-diaphragm lens, and particularly to a front-diaphragm wide angle lens having an angle of view from 65° to 70° while being very simple in construction.

2. Description of the Prior Art

In small type cameras, it is often desirable that a diaphragm is located outside the lens because of the simplification of constructio of the camera.

A front-diaphragm lens wherein a diaphragm is arranged forwardly of a lens has an advantage that may utilize an image space between a lens and an image surface, and therefore, it is advantageous to arrange constituent members of a small camera. In addition, since an entrance pupil is free from deformation caused by an optical system, 100% of relative illumination may be obtained unless eclipse caused by lens is present. Thus, the front-diaphragm lens is particularly useful for the wide angle lens.

In this case, however, the lens is arranged extremely asymmetrically relative to the diaphragm, and therefore, compensation of comatic aberration and astigmatism is difficult to make and this tendency is further remarkable to provide a wide angle. It has been said that in a lens of simple construction comprising about three lenses, an angle of view exceeding 50° is impossible to be employed. For example, a lens of this kind is known from Japanese Patent Application Laid-Open No. 36226/78. This lens has a large aperture ratio of 1:3.5 but has an angle of view of 46°, and at the maximum, only 50°. If a half angle of view exceeds 15°, meridional astigmatism results in a surplus compensation, and therefore, the lens is not possible to be used as a wide angle lens.

SUMMARY OF THE INVENTION

This invention provides a lens which has a simple construction merely comprising three single lenses and yet has an angle of view of over 65°, up to approximately 70°, and which is well compensated in aberration.

The present invention overcomes the aforementioned problems by the provision of a front-diaphragm lens comprising, successively from an object, a first lens $L_1$ comprising a double convex positive lens, a second lens $L_2$ comprising a double concave negative lens, and a third lens $L_3$ comprising a meniscus positive lens with a convex surface directed toward an image side,
the following conditions are met:

$$1.15 < r4/|r3| < 2.5 \quad (1)$$

$$0.7 < |r5|/r3 < 1.2 \quad (2)$$

$$0.5 < |r6|/r1 < 0.7 \quad (3)$$

$$0.2f < \Sigma d < 0.28f \quad (4)$$

$$0.03f < d_2 + d_4 < 0.09f \quad (5)$$

$r_i$: radius of curvature of a refractive surface of the $i^{th}$ from the object side
$d_i$: thickness of lens or space of lens of the $i^{th}$ from the object side
$\Sigma d$: full length of lens
f: focal length of the entire lens system The above-described condition (1) is provided to prevent an occurrence of coma and a surplus compensation of a meridional image surface. In the front-diaphragm lens as in this invention, the diaphragm is arranged forwardly of the lens, and asymmetrical coma tends to occur relative to oblique luminous fluxes passing the marginal portions of the second lens $L_2$ and the third lens $L_3$. This phenomenon rapidly increases as the angle of view increases as described above, and when the half angle of view exceeds 25° as the coma increases, the meriodinal astigmatism is also remarkably surplus in compensation. The condition (1) is provided to reverse the relation of $|r3| > r4$ in a general triplet and prevent an occurrence of asymmetrical coma which rapidly increases due to the fact that the oblique luminous flux passing the marginal portion of the lens $L_2$ is subjected to intensive refracting action of r4 as the angle of view increases and of the meriodinal astigmatism which is surplus in compensation. If the value in the condition (1) exceeeds the lower limit, these aberrations becomes surplus-compensated. Conversely, when the value exceeds the upper limit, falling of the image surface toward the lens is made impossible to make compensation.

The condition (2) is provided to select the shape of an air lens formed between the second lens $L_2$ and the third lens $L_3$ in accordance with the condition (1) and of the lens $L_3$ in a manner such that various aberrations are well compensated. As described above, in the front-diaphragm wide angle lens, the asymmetrical coma is remarkable as the diameter of the rear lens increases. To compensate this, it is advantageous that the lens $L_3$ is arranged centripetally, i.e., where the center of radius of curvature is in a surface in the vicinity of the diaphragm. That is, it is necessary that the surface r5 of the lens $L_3$ on the object side is concave toward the object to have a small value. Thereby, a curve of a positive image surface occurring when the r4 assumes a large value in accordance with the condition (1) can also be compensated. When the r5 exceeds the lower limit of the condition (2) to be small, the positive refracting power of $L_3$ is short. If this short is intended to be compensated by the radius of curvature r6 of the image side, compensation of the spherical aberration is extremely short. Conversely, when the value exceeds the upper limit to be large, the centripetal property of the $L_3$ with respect to the diaphragm decreases and the asymmetrical coma increases.

The condition (3) is concerned with a contour of a lens formed by both outer surfaces in the front-diaphragm lens. In the condition (3), the spherical aberration is well compensated and the contour of the lens is formed centripetally with respect to the diaphragm to thereby compensate for the comatic aberration and astigmatism. When the value exceeds the lower limit, the centripetal property with respect to the diaphragm is intensified, and the comatic aberration and the meridional image surface are turned out good even at a high angle of view. However, the refracting power of the lens $L_3$ is intensified and the Petzval's sum increases. When the value exceeds the upper limit, the centripetal property of the lens with respect to the contour of the lens reduces. Therefore, when the half angle of view exceeds 25°, the assymetrical coma is intensified and the meridional image surace is rapidly surplus in compensation.

The condition (4) is provided for the full length of the lens to increase relative illumination despite the wide angle of view, maintain the lens system small and compensate aberrations in good order. When the value exceeds the lower limit, it is advantageous for miniaturization and increase in relative illumination while the refracting power of $L_1$ and $L_2$ is intensified to render good compensation of aberrations difficult. When the value exceeds the upper limit, the diameter of the rear lens increases and the relative illumination decreases.

The condition (5) is provided for the aerial space between lenses to maintain the lens system small, increase the relative illumination and compensate aberrations in good order. In case of wide angle, it is especially effective for miniaturization of the lens system to decrease $d_2+d_4$. However, if the $d_2+d_4$ is excessively made small, the effect of the air lens between $L_1$ and $L_2$ and between $L_2$ and $L_3$ reduces. To compensate for this, it is necessary to increase the refracting power of the individual single lenses. The lower limit serves to maintain the refracting power necessary for the single lenses, maintain the good aberration compensation state and provide the sum of minimum air space capable of being made. When the air space increases, the relative illumination rapidly decreases as the angle of view increases. To prevent this, it is necessary to increase the diameter of lens $L_3$. However, when the value exceeds the upper limit, the diameter of the lens $L_3$ excessively increases, and aberrations are deteriorated to make it difficult to obtain a wide angle lens having an angle of view larger than 65° as in the present invention.

BRIEF DESCRIPTION OF THE DRAWINGS

FIGS. 1, 3 and 5 are sectional views showing the constructions of Embodiments 1, 2 and 3, respectively, in accordance with the present invention; and FIGS. 2, 4 and 6 are respectively aberration curves therefor.

DETAILED DESCRIPTION OF THE PREFERRED EMBODIMENTS

Embodiments of a wide angle lens according to the present invention will be given hereinafter. Symbols in the following tables other than those described previously are as follows:

$n_i$: refractive index relative to line d of the $i^{th}$ lens $L_i$
$v_i$: Abbe's number of the $i^{th}$ lens $L_i$.

|  | f = 100 | 1:8 | Angle of view 65° |
|---|---|---|---|
| Embodiment 1 | | | |
| r1 = 48.645 | | | |
| | $d_1 = 6.31$ | $n_1 = 1.83400$ | $v_1 = 37.3$ |
| r2 = −124.113 | | | |
| | $d_2 = 2.44$ | | |
| r3 = −40.401 | | | |
| | $d_3 = 3.15$ | $n_2 = 1.72825$ | $v_2 = 28.3$ |
| r4 = 59.469 | | | |
| | $d_4 = 3.15$ | | |
| r5 = −57.002 | | | |
| | $d_5 = 8.83$ | $n_3 = 1.77250$ | $v_3 = 49.6$ |
| r6 = −29.455 | | | |
| $\Sigma d = 23.88$ | | | |
| Diaphragm position forwardly of a first surface 6.43 | | | |
| Embodiment 2 | | | |
| r1 = 45.326 | | | |
| | $d_1 = 6.80$ | $n_1 = 1.80450$ | $v_1 = 39.6$ |
| r2 = −53.542 | | | |
| | $d_2 = 0.77$ | | |
| r3 = −35.159 | | | |
| | $d_3 = 2.85$ | $n_2 = 1.69895$ | $v_2 = 30.1$ |
| r4 = 47.138 | | | |
| | $d_4 = 2.91$ | | |
| r5 = −40.245 | | | |
| | $d_5 = 8.47$ | $n_3 = 1.77250$ | $v_3 = 49.6$ |
| r6 = −28.170 | | | |
| $\Sigma d = 21.8$ | | | |
| Diaphragm position forwardly of a first surface 6.4 | | | |
|  | f = 100 | 1:8 | Angle of view 70° |
| Embodiment 3 | | | |
| r1 = 53.714 | | | |
| | $d_1 = 6.15$ | $n_1 = 1.83400$ | $v_1 = 37.3$ |
| r2 = −243.039 | | | |
| | $d_2 = 3.79$ | | |
| r3 = −40.035 | | | |
| | $d_3 = 3.16$ | $n_2 = 1.74077$ | $v_2 = 27.8$ |
| r4 = 77.829 | | | |
| | $d_4 = 2.53$ | | |
| r5 = −76.587 | | | |
| | $d_5 = 8.84$ | $n_3 = 1.80420$ | $v_3 = 46.5$ |
| r6 = −30.828 | | | |
| $\Sigma d = 24.47$ | | | |
| Diaphragm position forwardly of a first surface 6.44 | | | |

Figure 1:
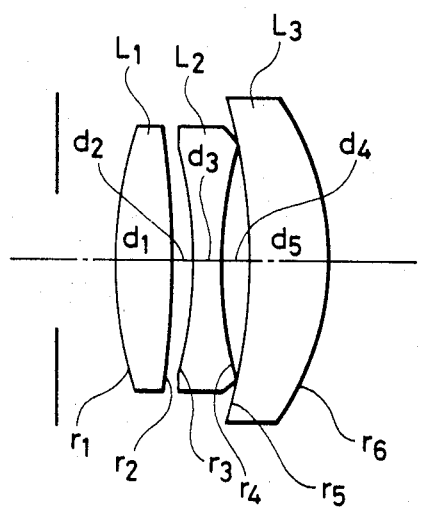
Figure 2:
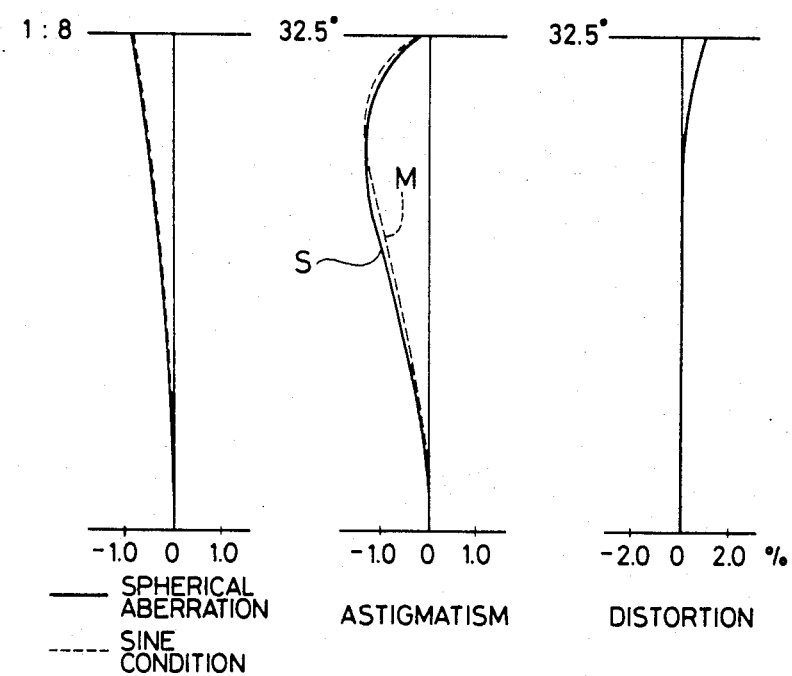
Figure 5:
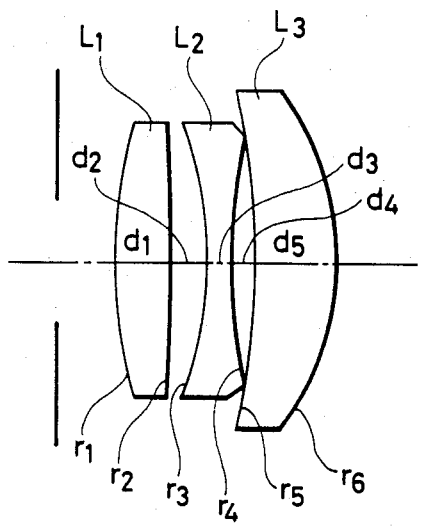
Figure 6:
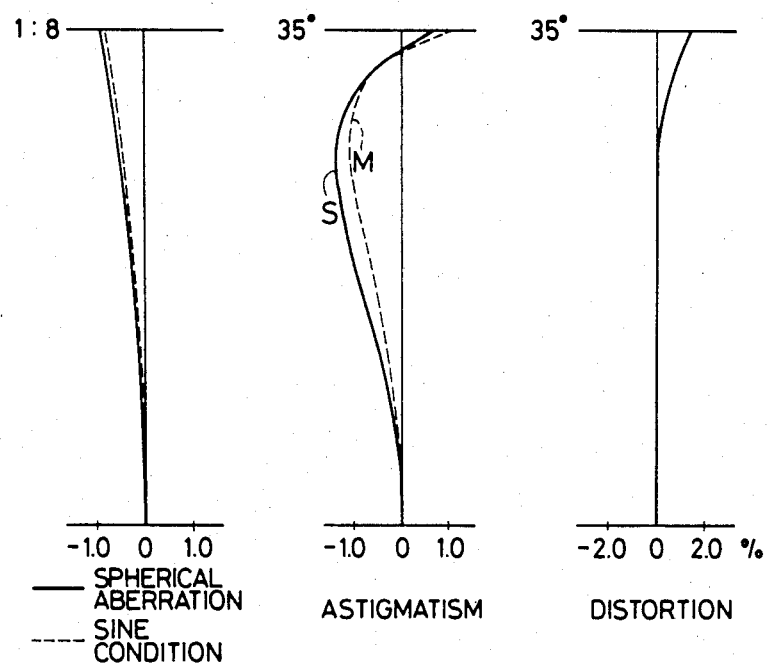

As the sectional views of constructions of the above-described Embodiments 1, 2 and 3 are shown in FIGS. 1, 3 and 5, respectively, and the aberration curves therefor are shown in FIGS. 2, 4 and 6, respectively, the meriodinal astigmatism and various aberrations are compensated in very good order despite the fact that the lens is composed of a simple structure, three lenses and three groups, and of the disadvantageous restriction, the front-diaphragm and wide angle. There is a sufficient relative illumination. Since the entrance pupil is free from deformation caused by the optical system as previously described, if a slight lowering in depiction in the extreme marginal portion is allowed, the angle of view up to 75° can be practically used and the lens of the present invention can be extensively applied not only to the photographic lens but lenses for superwide angle facsimile.

What is claimed is:

1. A front-diaphragm wide angle lens comprising, successively from a object side, a first lens $L_1$ comprising a double convex positive lens, a second lens $L_2$ comprising a double concave negative lens, and a third lens $L_3$ comprising a meniscus positive lens with a convex surface thereof directed toward an image side, the following conditions are met:

$1.15 < r_4/|r_3| < 2.5$ $0.7 < |r_5|/r_4 < 1.2$ $0.5 < |r_6|/r_1 < 0.7$ $0.2f < \Sigma d < 0.28f$ $0.03f < d_2+d_4 < 0.09f$ $r_i$: radius of curvature of a refractive surface of the $i^{th}$ from the object side
$d_i$: thickness of lens or space of lens of the $i^{th}$ from the object side
$\Sigma d$: full length of lens
f: focal length of the entire lens system.

2. A wide angle lens of claim 1 having the following data

| f = 100 | | 1:8 | Angle of view 65° |
|---|---|---|---|
| r1 = 48.645 | | | |
| | d₁ = 6.31 | n₁ = 1.83400 | ν₁ = 37.3 |
| Σd = 23.88 | | | |
| Diaphragm position forwardly of a first surface 6.43 | | | |

3. A wide angle lens of claim 1 having the following data

| f = 100 | | 1:8 | Angle of view 65° |
|---|---|---|---|
| r1 = 45.326 | | | |
| | d₁ = 6.80 | n₁ = 1.80450 | ν₁ = 39.6 |
| r2 = −53.542 | | | |
| | d₂ = 0.77 | | |
| r3 = −35.159 | | | |
| | d₃ = 2.85 | n₂ = 1.69895 | ν₂ = 30.1 |
| r4 = 47.138 | | | |
| | d₄ = 2.91 | | |
| r5 = −40.245 | | | |
| | d₅ = 8.47 | n₃ = 1.77250 | ν₃ = 49.6 |

| f = 100 | | 1:8 | Angle of view 65° |
|---|---|---|---|
| r6 = −28.170 | | | |
| Σd = 21.8 | | | |
| Diaphragm position forwardly of a first surface 6.4. | | | |

4. A wide angle lens of claim 1 having the following data

| f = 100 | | 1:8 | Angle of view 70° |
|---|---|---|---|
| r1 = 53.714 | | | |
| | d₁ = 6.15 | n₁ = 1.83400 | ν₁ = 37.3 |
| r2 = −243.039 | | | |
| | d₂ = 3.79 | | |
| r3 = −40.035 | | | |
| | d₃ = 3.16 | n₂ = 1.74077 | ν₂ = 27.8 |
| r4 = 77.829 | | | |
| | d₄ = 2.53 | | |
| r5 = −76.587 | | | |
| | d₅ = 8.84 | n₃ = 1.80420 | ν₃ = 46.5 |
| r6 = −30.828 | | | |
| Σd = 24.47 | | | |
| Diaphragm position forwardly of a first surface 6.44. | | | |

* * * * *